(12) United States Patent
Algüera Gallego

(10) Patent No.: US 8,651,547 B2
(45) Date of Patent: Feb. 18, 2014

(54) SYSTEM FOR REDUCING THE AIR RESISTANCE OF A TRUCK

(75) Inventor: José Manuel Algüera Gallego, Aschaffenburg (DE)

(73) Assignee: Jost-Werke GmbH, Neu-Isenberg (DE)

(\*) Notice: Subject to any disclaimer, the term of this patent is extended or adjusted under 35 U.S.C. 154(b) by 0 days.

(21) Appl. No.: 13/260,932

(22) PCT Filed: Mar. 29, 2010

(86) PCT No.: PCT/EP2010/054127
§ 371 (c)(1),
(2), (4) Date: Sep. 29, 2011

(87) PCT Pub. No.: WO2010/112467
PCT Pub. Date: Oct. 7, 2010

(65) Prior Publication Data
US 2012/0019021 A1     Jan. 26, 2012

(30) Foreign Application Priority Data
Mar. 30, 2009    (DE) .................... 10 2009 001 975

(51) Int. Cl.
*B62D 35/00*    (2006.01)

(52) U.S. Cl.
USPC .............. 296/26.05; 296/181.5; 296/185.1

(58) Field of Classification Search
USPC ......... 296/26.04, 26.05, 181.5, 181.7, 185.1, 296/100.5
See application file for complete search history.

(56) References Cited

U.S. PATENT DOCUMENTS

| | | | | |
|---|---|---|---|---|
| 2,797,124 A * | 6/1957 | Hauptli | | 296/26.05 |
| 3,140,116 A * | 7/1964 | Speas | | 296/26.05 |
| 3,694,024 A * | 9/1972 | Linville | | 296/26.05 |
| 4,206,943 A * | 6/1980 | Friedenberg | | 296/26.05 |
| 4,392,682 A * | 7/1983 | Norkus, Jr. | | 296/26.05 |
| 4,779,915 A * | 10/1988 | Straight | | 296/180.3 |
| 5,088,785 A * | 2/1992 | Lee | | 296/26.05 |
| 6,302,438 B1* | 10/2001 | Stopper et al. | | 280/735 |
| 6,890,013 B2* | 5/2005 | Lacy | | 296/26.09 |
| 6,930,592 B2* | 8/2005 | Schlecht et al. | | 340/426.29 |
| 6,981,739 B2* | 1/2006 | Plettenberg | | 296/223 |
| 7,118,164 B2* | 10/2006 | Frank et al. | | 296/180.5 |
| 7,261,354 B1 | 8/2007 | Lozano | | |
| 2001/0030599 A1* | 10/2001 | Zimmermann et al. | | 340/426 |
| 2008/0174423 A1* | 7/2008 | Breed | | 340/539.22 |

FOREIGN PATENT DOCUMENTS

| | | | | |
|---|---|---|---|---|
| DE | 88 10 497 U1 | 12/1988 | | |
| DE | 196 45 503 A1 | 5/1997 | | |
| DE | 197 56 307 A1 | 6/1999 | | |
| DE | 19756307 A1 * | 6/1999 | | B62D 21/14 |
| EP | 1 234 715 A1 | 8/2002 | | |
| EP | 1 375 254 A1 | 1/2004 | | |
| GB | 2 241 205 A | 8/1991 | | |
| GB | 2241205 A * | 8/1991 | | B60J 7/08 |
| GB | 2 360 494 A | 9/2001 | | |

\* cited by examiner

Primary Examiner — Jason S Morrow
Assistant Examiner — E Turner Hicks
(74) *Attorney, Agent, or Firm* — Hudak, Shunk & Farine Co. LPA

(57) ABSTRACT

A system for reducing the air resistance of a truck, particularly an articulated vehicle, wherein the vehicle comprises a cargo space that is limited downward by a loading floor and in the height thereof by a roof wall spaced apart therefrom. The aim is to provide a system that minimizes the face area of the truck and thus the fuel consumption in dependence on the actual cargo space used. According to one embodiment, the roof wall is height-adjustable opposite the loading floor.

19 Claims, 3 Drawing Sheets

SYSTEM FOR REDUCING THE AIR RESISTANCE OF A TRUCK

FIELD OF THE INVENTION

The invention relates to a system for reducing the air resistance of a truck, especially an articulated vehicle, wherein this comprises a cargo space that is bounded at the bottom by a loading floor and in its height by a roof wall spaced apart therefrom.

BACKGROUND OF THE INVENTION

Usually trucks are built with the largest possible cargo space. This generally means that the end surface is large, being in direct proportional relation to the air resistance, and hence the fuel consumption is high. On the other hand, the available cargo space is seldom utilized completely in practice, since oftentimes small freight units are transported or a free space is left on top of the cargo to provide sufficient freedom of movement when loading or unloading.

Accordingly, the problem on which the invention is based was to provide a system that minimizes the end surface of the truck and thus the fuel consumption in dependence on the cargo space actually utilized.

SUMMARY OF THE INVENTION

The problem is solved according to the invention with a system in which the roof wall is adjustable in height relative to the loading floor. This affords the advantage that the area of the end surface can be reduced by lowering the roof wall before starting the trip or during the trip, depending on the actually available cargo volume. For example, when the truck is not freighted or is only carrying low parcel units, it is possible to lower the roof wall to a level beneath the driver's cabin.

The height adjustment of the roof wall should occur in a plane preferably parallel to the originally adjusted orientation, basically parallel with the loading floor. Alternatively, the roof wall can also be oriented at a slant, in particular, descending toward the front.

Preferably, a height adjustment of the roof wall is possible by means of telescoping pillars. These can be coupled to each other at least in pairs with regard to their travel. The telescoping pillars should be arranged at the four corners of the cargo space for a uniform force bearing and for reasons of easy loading and unloading of cargo.

It has been found to be advantageous to outfit the pillars with a motorized drive unit. This enables an easy adjustment of the pillars for the driver: with one or more adequately dimensioned drive units, a simultaneous and thus fast lifting or lowering of the roof wall is possible. If several drive units are used it should be possible to actuate them via a common control unit. According to one particularly advantageous embodiment, the control unit is in remote control contact with an operating and display mechanism.

Advantageously, several motorized drive units are provided in the form of a spindle and/or a pneumatic cylinder and/or a rack. Alternatively or in addition, the motorized drive unit can also comprise a scissors linkage and/or a cable control. The aforementioned motorized drive units enable a continuous lateral repositioning of the pillars and thus a likewise continuous height adjustment of the roof wall.

Advantageously, the cargo space is bounded at the sides by height-adjustable side walls. These ensure an outwardly closed cargo space regardless of the position of retraction of the roof wall relative to the loading floor. A major benefit of the height-adjustable side walls is that, when the roof wall is lowered during driving operation, no excess material of the lateral side walls will hang down loosely from the truck and become damaged by flapping in the wind or endanger other traffic participants. The rear door should also be configured as a height-adjustable side wall.

When the side walls are of stable shape, these can be fashioned, e.g., as two-piece and overlapping in the vertical direction.

Alternatively, the height-adjustable side walls can also each be fashioned from a tarpaulin that can be rolled up about a horizontal axis. According to another embodiment, when the roof wall is lowered the tarpaulin can be laid in folds about a horizontal folding axis. The height-adjustable side walls should preferably be coupled to the motorized drive unit of the pillars. Instead of a tarpaulin, a roller shutter with several wall panels that are hinged together can be used.

According to an alternative embodiment, it is also possible to fashion the height-adjustable side walls from sliding or folding wall panels. They can be moved into or out from a magazine when the roof wall is being lowered or raised. Such a height adjustment of the lateral side walls is done advantageously without a special motorized drive unit provided for this.

The height adjustment can be set manually by the driver, preferably from the driver's cabin.

Preferably, the height adjustment comprises a preselector control unit in assignable stages, so that the driver at first inspects the cargo height in the cargo space. This can be facilitated, for example, by an optically readable measurement scale in the cargo space. Next, the driver enters the measurement value found in the preselector control unit, which sets in motion a movement of the roof wall and drives its in discrete steps to the next lower level.

Advantageously, however, instead of the visual determination of the cargo height, there is provided a cargo height recognition module, which recognizes the actual height of loading and automatically performs the height adjustment of the roof wall, if desired. This embodiment enables, in particular, a height adjustment remotely controlled from the driver's cabin, without the driver having to go inside the cargo space.

It has been found to be especially expedient for the cargo height recognition module to determine the height of loading by means of at least one laser and/or ultrasound sensor and/or infrared sensor. According to a first preferred embodiment, the laser and/or ultrasound sensor and/or infrared sensor are at the same time a transmitter and receiver and interact with reflectors arranged on the opposite side of the cargo space. Advantageously, two sender/receivers are arranged on the side wall next to the driver's cabin and two reflectors on the opposite side wall. An especially comprehensive surveying of the height of loading is accomplished when the signals emitted by the particular transmitter criss cross the cargo space.

In a second, especially preferred embodiment, the ultrasound sensor is configured as an ultrasound unit for 3D scanning of the cargo space. This involves a so-called three-dimensional scanner, which makes do without any additional reflectors. This embodiment minimizes the space requirement for the cargo height recognition module and at the same time lowers the risk of damage to the individual components by parts of the cargo during the loading and unloading process.

The height adjustment of the roof wall can also be done in dependence on the driving speed. If a control unit is used for the operation of the motorized drive units, this can communicate with the vehicle control unit, for example, and obtain a signal from the latter as to the driving speed. A height adjustment will then occur only when traveling on expressways or autobahns, where a reduction of the air resistance by a lowering of the roof wall is especially noticeable on account of the high speed of travel.

Advantageously, a spoiler is arranged on the roof of the truck, whose inclination can be adapted to the height of the roof wall. For this, the spoiler should also be outfitted with an adjustment motor. The adjustment motor according to an especially advantageous embodiment is connected to the control unit for the pillars of the roof wall and obtains a corresponding signal in dependence on its state of extension. This prevents the spoiler from being in an extended position when the roof wall has already been lowered and is situated, for example, in the wind shadow of the driver's cabin.

BRIEF DESCRIPTION OF THE DRAWINGS

For better understanding, the invention will now be explained more closely by means of five figures. There are shown.

DETAILED DESCRIPTION OF THE INVENTION

Figure 1:
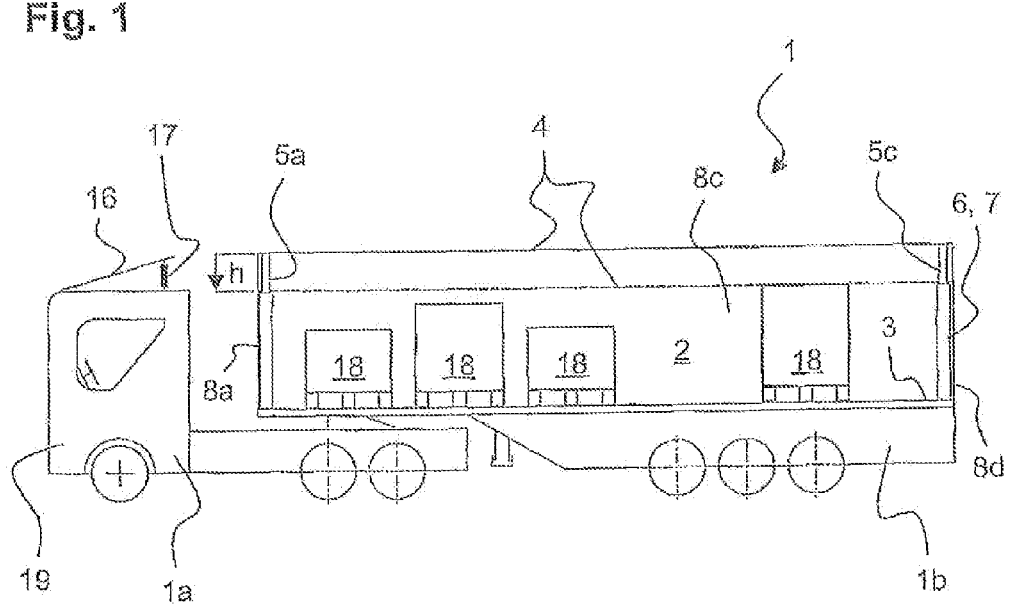
FIG. 1: a schematic side view of an articulated vehicle at maximum height of the cargo space.

FIG. 1 shows a truck 1, comprising a tractor 1a and a trailer 1b that can be removably secured to it by a customary fifth wheel. The trailer 1b has a cargo space 2, on whose loading floor 3 a total of four freight units 18 are placed. The freight units 18 are, for example, Euro pallets with piece goods located on them.

Figure 2:
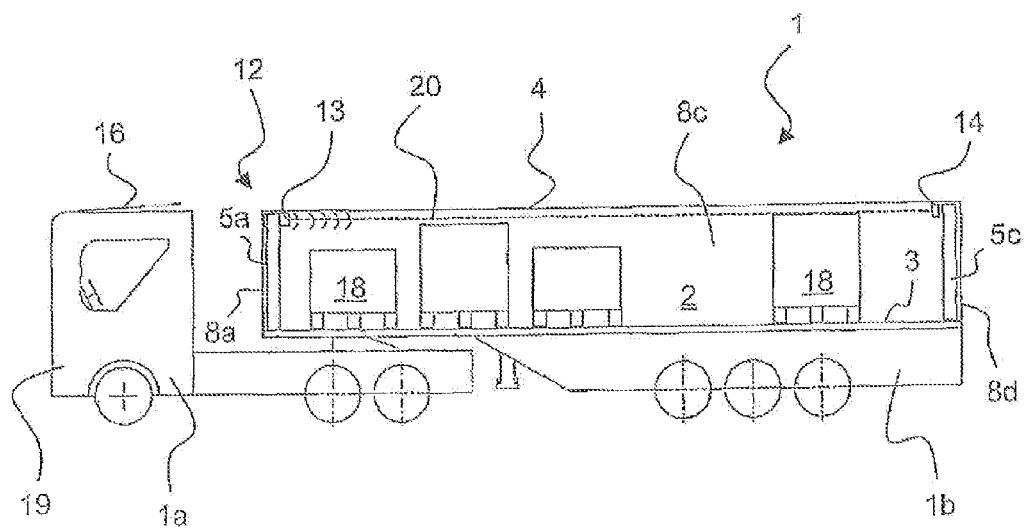
FIG. 2: a view of the articulated vehicle of FIG. 1 with roof wall lowered.

The cargo space 2 is surrounded on the sides by side walls 8a, 8b, 8c, 8d oriented perpendicular to the loading floor 3, the side wall 8d in the schematic side views of FIGS. 1 and 2 being configured as a rear door, and the side wall 8b has been left out for reasons of clarity. At the top, the cargo space 3 is closed by a roof wall 4 oriented parallel to it.

The roof wall 4 is supported relative to the loading floor 3 at the front and rear end of the trailer 1b by two pillars each 5a, 5b, 5c, 5d. In the position depicted for the roof wall 4, this towers above the driver's cabin 19 of the tractor 1a in the vertical direction, on the roof of which is arranged a spoiler 16 to reduce the air resistance.

The freight units 18 placed on the loading floor 3 only partly fill up the cargo space 2, especially at the top, so that a lowering of the roof wall 4 according to the invention to the level sketched with broken line by the travel path h is possible. For this, the pillars 5a, 5b, 5c, 5d outfitted with a motorized drive unit 6 are retracted, using preferably a pneumatic cylinder 7 as the drive unit 6.

After the adjustment of the roof wall 4 to a level corresponding to the actual freighting, the position of the spoiler 16 should also be adapted. This can be done, for example, with an adjustment motor 17 engaging with the spoiler 16, advisedly carrying out the adjustment of the spoiler 16 and the roof wall 4 by a shared electronic control device, not shown here.

In FIG. 2, the roof wall 4 of the trailer 1b is reduced to a lower level corresponding to the height of the loaded freight units 18. Its upper edge is detected by a cargo height recognition module 12, which comprises in the area of the front pillars 5a, 5b (also see FIG. 3) a combination transmitter/receiver 13 and in the rear area, near the pillars 5c, 5d, a corresponding reflector 14. After completion of the loading operation, the transmitter/receiver 13 emits a signal in the direction of the reflector 14, which, if no freight units 18 block the beam path 20, is reflected by it and detected by the transmitter/receiver 13. Both the transmitter/receiver 13 and the reflector 14 should be arranged stationary to the roof wall 4. A lowering of the roof wall 4 is then possible until the beam path 20 is interrupted by at least one freight unit 18 in the manner of a light barrier.

By lowering the roof wall 4 below the level of the driver's cabin 19, there is a massive reduction in the air resistance. In this position of the roof wall 4, the spoiler 16 can be used with the least possible inclination.

Figure 3:
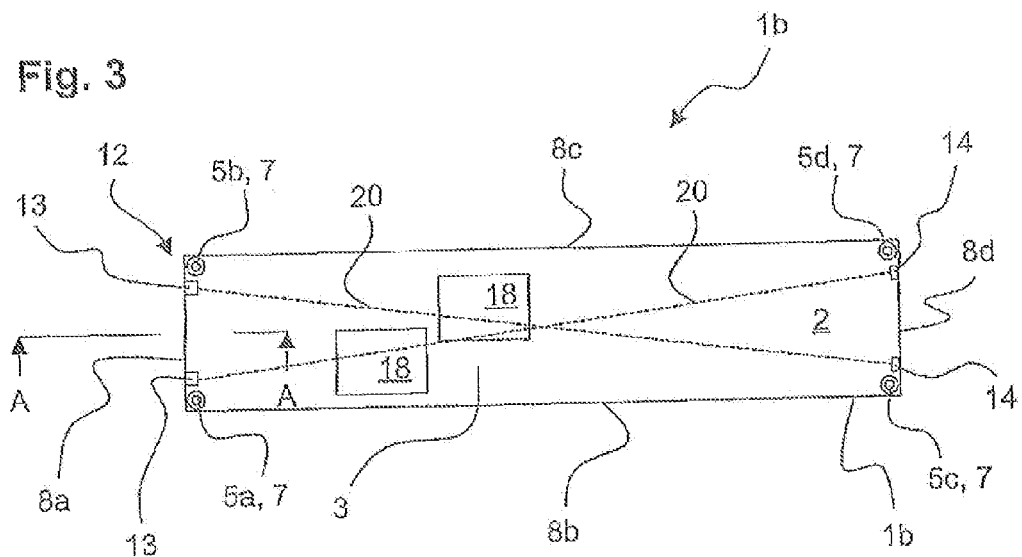
FIG. 3: a top view of a trailer with a cargo height recognition module located inside according to a first embodiment.

FIG. 3 shows in a top view the intersecting beam path 20 of two transmitter/receivers 13 and the two corresponding reflectors 14. By arranging the interacting transmitter/receivers 13 and reflectors 14 on opposite sides of the trailer 1b, an especially comprehensive monitoring of the cargo space 2 results.

Figure 4:
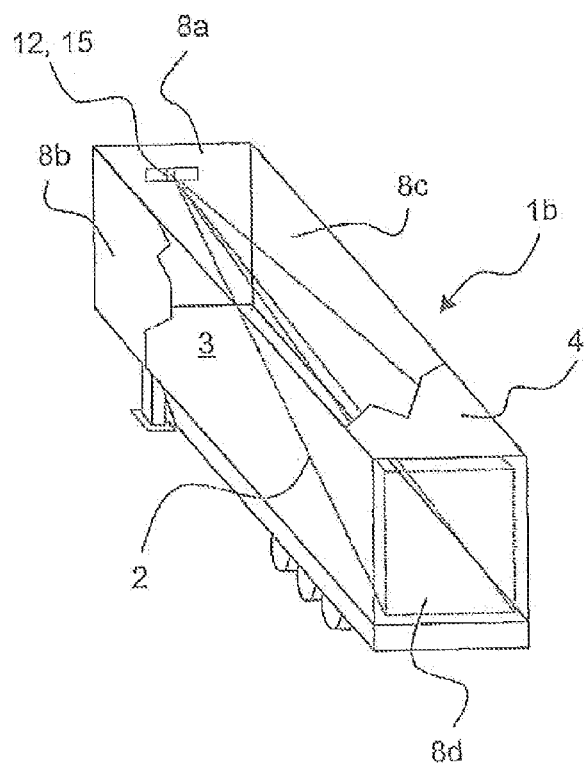
FIG. 4: a three-dimensional view of a trailer with a cargo height recognition module located inside according to a second embodiment.

An alternative embodiment of the cargo height recognition module 12 is shown in FIG. 4. Here, a 3D ultrasound unit 15 is located in the front side wall 8a, at the end surface, which scans the cargo space 2 and thereby determines the loading height of any freight units 18. This embodiment makes do without any additional reflectors 14. Furthermore, it is possible to install the 3D ultrasound unit 15 stationary in the side wall 8a, which further reduces the risk of damage or unintentional disturbance of the setting.

With the lowering of the roof wall 4 it is also advisable to adapt the height of the side walls 8a, 8b, 8c, 8d and thereby ensure a cargo space 2 constantly closed all around. In the following described FIGS. 5a, 5b, 5c, each time for reasons of better visibility the front side wall 8a at the end surface is depicted as being variably adjustable. The side walls 8b, 8c, 8d are likewise made height-adjustable in similar fashion.

Figure 5A:
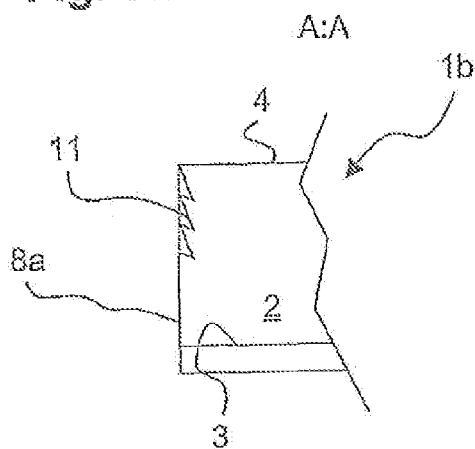
FIG. 5a: a partial longitudinal section along the plane A:A in FIG. 3 with height-variable side walls made from folding wall panels.

According to the embodiment shown in FIG. 5a, the height adjustment of the side walls 8a, 8b, 8c, 8d occurs by horizontally oriented wall panels 11, that are hinged together at their top and bottom lengthwise edge and come together like an accordion when the roof wall 4 is lowered. The side walls 8a, 8b, 8c, 8d here can be configured as elements of stable shape.

Figure 5B:
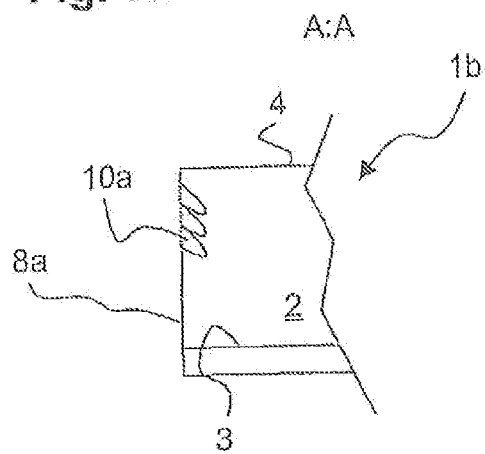
FIG. 5b: a partial longitudinal section along the plane A:A in FIG. 3 with height-variable side walls made from a tarpaulin that can be folded for stowage.

FIG. 5b shows a configuration for trucks 1 with a tarpaulin 10 covering the cargo space 2. This has one or more folds 10a in the horizontal direction, running across the entire width of the particular side wall 8a, 8b, 8c, 8d.

Figure 5C:
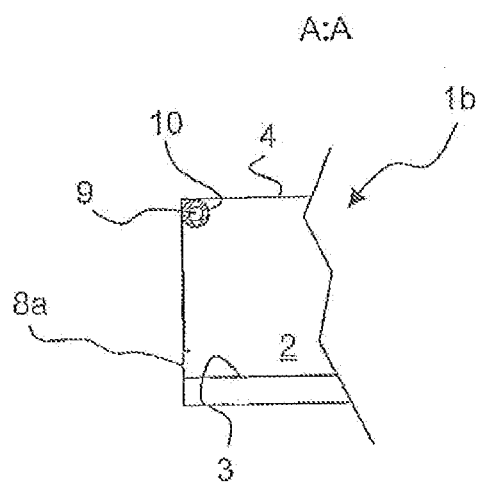
FIG. 5c: a partial longitudinal section along the plane A:A in FIG. 3 with height-variable side walls made from roller shutters.

In FIG. 5c one finds another embodiment in which the tarpaulin 10 or hinged wall panels 11 can be rolled up about a horizontal axis 9 and form a roller blind or a roller shutter.

LIST OF REFERENCE NUMBERS 1 truck
1a tractor
1b trailer
2 cargo space 3 loading floor
4 roof wall
5a-d pillars
6 motorized drive unit
7 pneumatic cylinder
8a-d side wall
9 horizontal axis
10 tarpaulin
10a tarpaulin fold
11 folding wall panels
12 cargo height recognition module
13 transmitter/receiver
14 reflectors
15 3D ultrasound unit
16 spoiler
17 spoiler adjustment motor
18 freight units
19 driver's cabin
20 beam path
h roof wall travel path

What is claimed is:

1. A system for reducing the air resistance of a truck, comprising:
the truck comprising a cargo space that is bounded at a bottom by a loading floor and in height by a roof wall spaced apart from the loading floor, wherein the roof wall is adjustable in height relative to the loading floor, wherein a cargo height recognition module is provided, which recognizes and determines an actual height of loading and wherein the cargo height recognition module automatically performs the height adjustment of the roof wall, wherein the height of the roof wall is adapted to be reduced by the cargo height recognition module to a lower level corresponding to a height of loaded freight units.

2. The system according to claim 1, wherein the distance between roof wall and loading floor can be changed by height-adjustable pillars.

3. The system according to claim 2, wherein the pillars are telescoping.

4. The system according to claim 2, wherein the pillars have a motorized drive unit.

5. The system according to claim 4, wherein the motorized drive unit comprises one or more of a spindle, a pneumatic cylinder, a rack, a scissors linkage and a cable control.

6. The system according to claim 1, wherein the cargo space is bounded at the sides by height-adjustable side walls.

7. The system according to claim 6, wherein at least one height-adjustable side wall is configured as a height-adjustable rear door.

8. The system according to claim 6, wherein the height-adjustable side was are each formed from a tarpaulin rolled up about a horizontal axis.

9. The system according to claim 6, wherein the height-adjustable side walls are formed from sliding or folding wall panels.

10. The system according to claim 1, wherein the cargo height recognition module determines the height of loading by one or more of at least one laser, an ultrasound sensor, and an infrared sensor.

11. The system according to claim 10, wherein the one or more of the laser, ultrasound sensor, and infrared sensor are at the same time a transmitter and receiver and interact with reflectors arranged on an opposite side of the cargo space.

12. The system according to claim 10, wherein the ultrasound sensor is configured as an ultrasound unit for 3D scanning of the cargo space.

13. The system according to claim 1, wherein the height adjustment of the roof wall is done in dependence on the driving speed.

14. The system according to claim 1, wherein a spoiler is arranged on a roof of the truck, whose inclination can be adapted to the height setting of the roof wall.

15. A system for reducing the air resistance of a truck, comprising:
the truck comprising a cargo space that is bounded at a bottom by a loading floor and in height by a roof wall spaced apart from the loading floor, wherein the roof wall is adjustable in height relative to the loading floor, wherein a cargo height recognition module is provided, which comprises a transmitter/receiver as well as a reflector and recognizes an actual height of loading, wherein the cargo height recognition module automatically performs the height adjustment of the roof wall, wherein the transmitter/receiver and the reflector are arranged stationary in relation to the roof wall.

16. The system according to claim 15, wherein after completion of a loading operation, the transmitter/receiver emits a beam path in the direction of the reflector and the roof wall is lowered until the beam path is interrupted by at least one freight unit.

17. A system for reducing the air resistance of a truck, comprising:
the truck comprising a cargo space that is bounded at a front by a front side wall, at a bottom by a loading floor and in height by a roof wall spaced apart from the loading floor, wherein the roof wall is adjustable in height relative to the loading floor, wherein a cargo height recognition module is provided, which recognizes and determines an actual height of loading, automatically performs the height adjustment of the roof wall and has a single 3D ultrasound unit, which is located on the front side wall, scanning the cargo space and thereby determining the loading height of freight units.

18. A system for reducing the air resistance of a truck, comprising:
the truck comprising a cargo space that is bounded at a bottom by a loading floor and in height by a roof wall spaced apart from the loading floor, wherein the roof wall is adjustable in height relative to the loading floor, wherein a spoiler is arranged on a roof of the truck, whose inclination can be adapted to the height setting of the roof wall, the spoiler is driven by an adjustment motor and the adjustment motor is connected to a control unit which is also connected to pillars of the roof wall obtaining a corresponding signal in dependence on its state of extension.

19. A system for reducing the aft resistance of a truck, comprising:
the truck comprising a cargo space that is bounded at a bottom by a loading floor and in height by a roof wall spaced apart from the loading floor, wherein the roof wall is adjustable in height relative to the loading floor, wherein a cargo height recognition module is provided, which recognizes an actual height of loading and wherein the cargo height recognition module automatically performs the height adjustment of the roof wall, and wherein a lowering of the roof wall is possible until a beam path is interrupted by at least one freight unit in the manner of a light barrier.

* * * * *

UNITED STATES PATENT AND TRADEMARK OFFICE
CERTIFICATE OF CORRECTION

| | | |
|---|---|---|
| PATENT NO. | : 8,651,547 B2 | Page 1 of 1 |
| APPLICATION NO. | : 13/260932 | |
| DATED | : February 18, 2014 | |
| INVENTOR(S) | : Jose Manuel Alguera Gallego | |

It is certified that error appears in the above-identified patent and that said Letters Patent is hereby corrected as shown below:

In the Claims:

In column 5, claim 8, line 52, replace "was" with --walls--

In column 6, claim 19, line 53, replace "aft" with --air--

Signed and Sealed this
Twenty-seventh Day of May, 2014

Michelle K. Lee
*Deputy Director of the United States Patent and Trademark Office*